United States Patent Office 3,671,264
Patented June 20, 1972

3,671,264
PACKAGED MIXES FOR FLAVORED FOOD PRODUCTS AND THE PROCESS OF MAKING THEM
Harvey J. Drews and Stanley P. Raffensperger, Knoxville, Tenn., assignors to The White Lily Foods Company, Knoxville, Tenn.
No Drawing. Filed May 4, 1970, Ser. No. 34,633
Int. Cl. A23l 1/00, 1/26; A21d 2/00
U.S. Cl. 99—94
14 Claims

ABSTRACT OF THE DISCLOSURE

Packaged dry mixes containing artificially flavored lumps in which the major ingredients functioning in the formation and texture of the lumps are high melting point hydrogenated vegetable fat, pregelatinized starch, sucrose and dextrose. The lumps are formed by blending and extrusion. The lumps are added to and packaged in combination with various dry mixes which can be stored at normal ranges of temperature and humidity for relatively long periods of time.

BACKGROUND OF THE INVENTION (1) Field of the invention

This invention pertains to a food product, more particularly artificially flavored lumps, combined and packaged with dry mixes, and to the process of forming the lumps and combining them with the dry mix and packaging them. The lumps are transformed during cooking into discrete masses simulating a range of characteristics from those of natural fruit particles to a characteristic near-fruit form, such as fruit jellies.

(2) Description of the prior art

The prior art consists, generally, of natural fruits and berries, packaged in physical separation from dry mixes, dehydrated fruits and berries packaged with dry mixes, alginate beads and flavored fat particles.

Many natural fruits and berries, and portions thereof, are easily abused physically, and, when mixed with, and in, a batter system, become broken in structure and changed in texture. Further, natural fruits and berries lose palatability and eventually edibility after just a very short shelf life at normal temperatures and humidities. The appearance, palatability and edibility of natural fruits and berries deteriorate rapidly when exposed to uncontrolled ambient temperatures and humidities.

Due to the degradation of natural fruits and berries, it has therefore been necessary to separately package canned fruits or fruit particles and commercial baking type dry flour based mixtures within an outer consumer package. This product is relatively expensive to produce, and, therefore, more costly to the consumer. This product is heavy, cumbersome and inefficient, as the fruit or fruit particles must be physically combined by the consumer with the dry flour based mixture. Three different packages must be opened. If the fruit used is placed in a can, packaging weight is substantially increased, and ambient juice or liquid must be drained off after the can is opened, necessitating the use of extra kitchen implements. Additionally, the fruit may break during mixing of the resulting dough or batter.

Another method of packaging and presenting a product has been the inclusion of a combination of dry mix with dehydrated fruit in moisture proof packaging. This too is relatively expensive to produce and, therefore, more costly to the consumer. Additionally, rehydration of the dehydrated fruit proceeds relatively slowly.

Previous attempts at manufacturing artificial fruits and berries consist mainly of forming alginate beads, which are markedly inferior to the product of our invention, when used for cooked products, in appearance, texture, chewability, and "shelf life." These alginate beads are generally formed by reacting an alginate sol with a metal ion solution. The alginate beads have a relatively high moisture content and the evaporation of this moisture necessarily causes a hardening of the "case" or "shell" of the beads over a period of time. Further, if the alginate beads are mixed and packaged with dry mixes, such as flour and the like, the beads dehydrate further. The migration of moisture from the beads to the mix results in the moulding and caking of the dry mix. The manufacture of these beads necessarily entails the utilization of a number of chemicals and various critical steps, some steps necessarily including the use of abnormally low, and carefully effectuated, temperature ranges. The alginate beads have generally been sold in a moist or wet form to institutional bakers, and have not found a consumer market. They have not been packaged with dry flour based mixes.

Other previous attempts at flavored fillings have included the formation of flavored fat particles. The fats utilized in the formation of these particles must necessarily be mixed at a raised temperature. Therefore, the fats utilized are in an initially liquid state. The resulting fat particles do not have the water absorptive properties of the lumps of our invention. The hygrophobic fat particles do not dehydrate to form the texture variations of our invention when the fat particles are baked in a batter or dough mix.

In the formation of both alginate beads and flavored fat particles, the processes of their formation involve steps which take place at a plurality of different temperatures, which may make the two processes relatively costly.

No prior art product is as stable as our invention in appearance, palatability, or edibility over the wide range of temperature and humidity that is necessarily encountered by food products while stored at normal temperature for commercial distribution to the wholesale, institutional, and retail markets or while being displayed or stored for consumer sale in a retail market.

OBJECTIVES AND SUMMARY OF THE INVENTION (1) Objectives of the invention

The objectives of this invention include the production of artificially flavored lumps which have the characteristics of their natural counterparts, such as fruit, or the jelly derivatives of their natural counterparts, insofar as flavor, texture, appearance, color and aroma are concerned. It is a further objective that the lumps be capable of being stored by themselves for long periods of time at normal ranges of temperature and humidity. It is still a further objective that the lumps are adapted to be stored in combination with various conventional dry mixes. It is still a further objective that the lumps are constituted in such a manner, when dispersed in a dough or batter and cooked, as to hydrate to assume and retain the desired characteristics of their natural counterparts, such as fruit, or near-fruit forms, such as jellies. It is still a further objective that these lumps be so formed as to resist physical degradation during commercial mixing in dough and batter systems, as well as during dry blending with bakery mixes such as muffin and cake mixes.

(2) Summary of the invention

The major functional ingredients which comprise the product, and effectuate, after cooking, the resultant texture and consistency of flavored fruit particles or their jelly derivatives, are:

(1) High melting point hydrogenated vegetable fat: utilized to physically bind the other major functional ingredients together and to enable the lump to maintain its shape during (i) blending with a dry mix; (ii) the subsequent blending of the dry mix with liquids; and (iii) cooking. The preferred form of high melting point hydrogenated vegetable fat used is that which has a melting point of 101°–123° F.

(2) Starch: utilized to enable the cooked lump to have the texture and appearance of natural food particles, such as fruit particles, or near-natural forms. The amount of starch utilized controls the rigidity of the hydrated form. The preferred form of starch utilized is pregelatinized (modified) starch, or a starch which hydrates relatively quickly when added to a liquid media, and one which does not depend solely upon temperature to open up the starch granules. Additionally, the starch aids in solubilizing the other functional ingredients by attracting liquid to them.

(3) Sucrose: utilized to help build soluble solids characteristic of the desired end product, as well as provide the characteristic sweetness in the hydrated form. The sucrose utilized can range from fine granulated to powdered.

(4) Dextrose: utilized for the same general purpose as sucrose. In addition, the dextrose aids in retarding recrystallization of the sucrose when the lumps are hydrated during cooking.

The ranges in quantity of the above mentioned ingredients are as follows:

High melting point hydrogenated vegetable fat: 24.0%–47.0%.

Starch: .5%–35.0%

Sucrose and dextrose: 1.0%–75.0%.

Another ingredient is artificial and/or natural flavor. Other ingredients may include a food grade acidulant, for example, malic acid or citric acid, also utilized for flavor, and food grade color, utilized for color.

The ingredients are combined by blending, then after combination, extruded in lump form, and, finally, classified. Means other than extrusion, such as granulation, may be employed to form the lumps.

The lumps are blended with a dry mix and retain their physical shape during such blending with, and packaging with, any common dry mix; for example, biscuit, muffin, pancake, or the like. The proportion of lumps blended with the dry mix is a matter of choice. Any well-known packaging media may be used, such as a flexible package or a carton. The packaging is preferably moisture-proof.

After the batter is made from the dry mix, and as it is cooked, the lumps develop textures ranging from that of a natural food particle to its near-natural form, such as jelly.

The packaged combination of the dry mix and the lumps have a "shelf life" of up to twelve months under normal conditions of temperature and humidity.

DESCRIPTION OF PREFERRED EMBODIMENTS

Example I

A formulation of materials for artificially flavored blueberry lumps for combination with a muffin mix was prepared as follows:

|  | Percent |
| --- | --- |
| Sucrose, powdered | 40.23 |
| Hydrogenated vegetable fat, melting point 117° F. | 32.00 |
| Dextrose, powdered | 14.30 |
| Starch, modified | 13.00 |
| Citric acid, powdered | .30 |
| Blueberry color (FD&C Lake & Dye Combination) | .13 |
| Imitation blueberry flavor, spray dried | .04 |
|  | 100.00 |

The lumps were formulated in an environment with an ambient temperature range of 60°–72° F.

First, the following ingredients were placed in a ribbon blender in the following order: approximately half the sucrose, all the flavor, all the color, all the citric acid, all the starch, and all the dextrose. Then the remaining sucrose was added. The combined ingredients were blended together for 2–3 minutes. Next the hydrogenated vegetable fat was added and blended with the other ingredients for a minimum of 3 minutes. All ingredients were blended in batches of approximately 250 lbs. and the total mixing time for a batch was approximately 7–8 minutes.

Next, the blended mixture was passed through an extruder. The extrusion was accomplished by feeding the blended mixture, without applying pressure, into the feed tube of a grinder. In this case, a Hobart Model $413_6$ meat grinder was used to extrude. The grinder was equipped with an extrusion plate having ¼" diameter orifices. The first pass of the blended mixture through the grinder produced a cohesive coarse cut lump. The entire batch was reextruded in order to firm the lump. The product was then fed into a cylindrical separator which removed all lumps of over ¾" length and under ¼" length. These lumps were then reworked through the extruder.

The finished lumps were placed in containers and stored until combined with muffin mix and packaged.

A formulation of muffin mix was prepared as follows:

|  | Percent |
| --- | --- |
| Flour | 60.00 |
| Sucrose | 16.00 |
| Shortening | 12.00 |
| Nonfat dry milk | 4.00 |
| Leavening | 4.00 |
| Dextrose | 2.50 |
| Salt | 1.48 |
| Yellow color (FD&C Lake & Dye Combination) | 0.02 |
|  | 100.00 |

A blend of 83% muffin mix (made using blending techniques well known in the art) was then blended together with 17% blueberry lumps to produce a dry mix. The dry mix was then packaged in a moisture proof package.

Blueberry muffins were then prepared from the dry mix. A batter was formed by using seven ounces of dry mix to which ½ cup of milk was added. The batter was then spooned into muffin cups by filling the cups approximately ⅔ full and baked at 425° for 12–14 minutes.

Example II

A formulation of materials for artificially flavored lemon lumps to be utilized in a muffin mix was prepared as follows:

|  | Percent |
| --- | --- |
| Sucrose | 45.00 |
| Dextrose | 30.00 |
| Starch | .50 |
| Hydrogenated vegetable fat, melting point 117° F. | 24.00 |
| Acidulant | .05 |
| Imitation lemon flavor | .01 |
| FD&C lemon color | .44 |
|  | 100.00 |

The lumps were produced as indicated in Example I, column 4, lines 1 through 25. The formulation of muffin mix, packaging and baking were accomplished as indicated in Example I, column 4, lines 28 through 53.

Example III

A formulation of materials for artificially flavored strawberry lumps to be utilized in a bread mix was prepared as follows:

| | Percent |
|---|---|
| Sucrose, powdered | 41.811 |
| Dextrose, powdered | 14.000 |
| Starch, modified | 13.244 |
| Citric acid, powdered | 0.280 |
| Hydrogenated vegetable fat, melting point 101° F. | 30.000 |
| Strawberry color (FD&C Lake & Dye Combination) | 0.175 |
| Imitation strawberry flavor, spray dried | 0.490 |
| | 100.000 |

The lumps were then produced as indicated in Example I, column 4, lines 1 through 25.

The formulation of bread mix was then prepared as follows:

| | Percent |
|---|---|
| Flour, self-rising | 49.18 |
| Sugar, white sucrose | 20.03 |
| Shortening, baker's margarine | 12.75 |
| Dried whole milk | 9.47 |
| Sugar, brown | 8.21 |
| Sodium stearyl fumarate | .36 |
| | 100.00 |

The bread mix was then blended as follows: first, the sugar, both white and brown, and the sodium stearyl fumarate were mixed. Second, the shortening was added. Third, the flour and dried whole milk were added. The ingredients were blended together for 2–3 minutes after each addition.

Bread mix in the amount of 85% and artificially flavored strawberry lumps in the amount of 15% were then combined using a ribbon blender and sufficient time allowed to assume thorough blending without causing attrition.

The packaging was accomplished as indicated in Example I, column 4, lines 47–48.

Strawberry bread was prepared from the dry mix as follows: a batter was formed by using 17 ounces of dry mix to which one egg and one cup of water were added. The batter was then baked in a loaf pan for 50–60 minutes at 350° F. and yielded one loaf.

Example IV

A formulation of materials for artificially flavored strawberry lumps to be utilized in a yeast bread mix was prepared as follows:

| | Percent |
|---|---|
| Sucrose, powdered | 41.811 |
| Dextrose, powdered | 14.000 |
| Starch, modified | 8.524 |
| Citric acid, powdered | 5.000 |
| Hydrogenated vegetable fat, melting point 117° F. | 30.000 |
| Strawberry color (FD&C Lake & Dye Combination) | .175 |
| Imitation strawberry flavor (spray dried) | .490 |
| | 100.000 |

The lumps were produced as indicated in Example I, column 4, lines 1 through 25.

The formulation of the yeast bread mix was as follows:

| | Percent |
|---|---|
| Flour, winter patent | 71.15 |
| Shortening | 14.22 |
| Sucrose | 8.53 |
| Nonfat dry milk | 2.13 |
| Yeast | 1.42 |
| Salt | 1.42 |
| Sodium stearyl fumarate | .35 |
| Vital wheat gluten | .71 |
| Sodium propionate | .07 |
| | 100.00 |

The strawberry yeast bread was made as follows: the sugar, yeast, salt and nonfat dry milk were dissolved in about half of the total water eventually used. In preparing the bread dough, 66% dry mix and 34% water were used. The flour, sodium stearyl fumarate, sodium propionate and vital wheat gluten were then added and the mixture mixed in the remaining water and stirred with a dough hook for five minutes. The shortening was then added and the mixture beaten until the dough pulled away from the sides of the bowls, or after approximately five minutes. Next, the mixture was proofed one hour, then, first punched. 17% of the lumps were added and the mixture stirred about one minute or until the lumps were well distributed, then proofed again for one hour. Then the dough was scaled at 14 ounces for an 8 x 4 inch loaf pan and rolled by kneading into a ball, rested for about 15 minutes and then shaped by flattening and folded over half of itself, pressed with palms between hands to seal, folded over the other half and sealed, folded over again and sealed and rolled with hang to even up the shape. It was then baked at 400° F. for 30 minutes.

Example V

A formulation of materials for artificially flavored blueberry lumps to be utilized in a pancake mix was prepared as follows:

| | Percent |
|---|---|
| Sucrose | 46.057 |
| Hydrogenated vegetable fat, melting point 112° F. | 31.000 |
| Dextrose | 20.000 |
| Starch | 2.500 |
| Citric acid | .280 |
| Blueberry color (FD&C Lake & Dye Combination) | .125 |
| Imitation blueberry flavor (spray dried) | .038 |
| | 100.000 |

The lumps were produced as indicated in Example I, column 4, lines 1 through 25.

A formulation of the pancake mix was prepared as follows:

| | Percent |
|---|---|
| Wheat flour | 65.00 |
| Corn flour | 27.50 |
| Dextrose | 3.50 |
| Leavening (a combination of monocalcium phosphate and sodium bicarbonate) | 3.50 |
| Starch, modified | .50 |
| | 100.00 |

A blend of 83% pancake mix was then blended with 17% blueberry lumps using blending techniques common to the art.

Blueberry pancakes were prepared with the mix as follows: a skillet was preheated. One cup of milk (or water), one egg and two tablespoons of oil were blended in a bowl. Seven ounces of the pancake mix were added and the mixture was stirred. The pancakes were cooked on a greased skillet until small bubbles appeared and edges began to dry, then turned and cooked until brown.

The recipe yielded approximately fifteen four inch pancakes.

Example VI

A formulation of materials for naturally flavored strawberry lumps to be utilized in a muffin mix was prepared as follows:

| | Percent |
|---|---|
| Sucrose | .5 |
| Dextrose | .5 |
| Starch | 35.0 |
| Hydrogenated vegetable fat, melting point 117° F. | 47.0 |
| Malic acid | 2.0 |
| Powdered natural flavor | 15.0 |
| | 100.0 |

The lumps were produced as indicated in Example I, column 4, lines 1 through 25. The formulation of muffin mix, packaging and baking were accomplished as indicated in Example I, column 4, lines 28 through 53.

The foregoing examples are only illustrative of various specimens of our invention, particularly insofar as the flavoring agents, food grade acidulants and color utilized in connection with the lumps are concerned.

We claim:

1. A packaged mix to be mixed with a liquid in the manufacture of a cooked food product comprising a dry flour based mixture and a flavored lump, such dry flour based mixture and lump being packaged together without physical separation within the same container, such lump comprising high melting point hydrogenated vegetable fat in the range of 24.0%–47.0%, pregelatinized starch in the range of 0.5%–35.0%, a combination of sucrose and dextrose in the range of 1.0%–75.0% and a flavoring agent.

2. A packaged mix as in claim 1, with the lump also including a food grade acidulant.

3. A packaged mix as in claim 2, with the lump also including color.

4. A packaged mix as in claim 1, with the lump also including color.

5. The process of manufacturing a packaged mix to be mixed with liquid in the manufacture of a cooked food product, said packaged mix comprising a dry flour based mixture and a flavored lump packaged together without physical separation within the same container, such process comprising the steps of blending a combination of sucrose and dextrose in the range of 1.0%–75.0%, 0.5%–35.0% pregelatinized starch, 24.0%–47.0% high melting point hydrogenated vegetable fat and a flavoring agent, forming the lump from the blended mixture by utilizing compressive forces, combining the lump with a dry flour based mixture and packaging the dry flour based mixture and lump together without physical separation within the same container.

6. The process as claimed in claim 5 with color being blended in the first step.

7. The process as claimed in claim 5 with a food grade acidulant also being blended in the first step.

8. The process as claimed in claim 7 with color being blended in the first step.

9. The process of manufacturing a flavored food product, consisting essentially of the steps of blending a combination of sucrose and dextrose in the range of 1.0%–75.0%, 0.5%–35.0% pregelatinized starch, 24.0%–47.0% high melting point hydrogenated vegetable fat and a flavoring agent, and then extruding the blended mixture to form a lump.

10. The process as claimed in claim 9, with color also being blended in the first step.

11. The process as claimed in claim 9, with a food grade acidulant also being blended in the first step.

12. The process as claimed in claim 11, with color also being blended in the first step.

13. The process of manufacturing a flavored food product, consisting essentially of the steps of blending a combination of sucrose and dextrose in the range of 1.0%–75.0%, 0.5%–35.0% pregelatinized starch, 24.0%–47.0% high melting point hydrogenated vegetable fat, a flavoring agent and a food grade acidulant and then extruding the blended mixture to form a lump.

14. The process as claimed in claim 13, with color also being blended in the first step.

References Cited
UNITED STATES PATENTS

| | | | |
|---|---|---|---|
| 2,899,313 | 8/1959 | Makower | 99—140 |
| 2,855,315 | 10/1958 | Perrozzi et al. | 99—92 X |
| 3,098,746 | 7/1963 | Noznick et al. | 99—94 X |

RAYMOND N. JONES, Primary Examiner

U.S. Cl. X.R.

99—140, 90